United States Patent [19]

Wada et al.

[11] 3,929,415

[45] Dec. 30, 1975

[54] E-ALUMINUM FLUORIDE BY EVAPORATING AQUEOUS HF SOLUTION OF ALF$_3$ UNDER VACUUM TO DRYNESS AND HEATING

[75] Inventors: Hiroyuki Wada, Mukomachi; Yasumasa Kawakami, Sakai; Tutomu Kamihigoshi, Takatsuki, all of Japan

[73] Assignee: Daikin Kogyo Co., Ltd., Japan

[22] Filed: July 22, 1974

[21] Appl. No.: 490,916

Related U.S. Application Data

[63] Continuation of Ser. No. 156,536, June 24, 1971, abandoned, which is a continuation of Ser. No. 770,337, Oct. 24, 1968, abandoned.

[30] Foreign Application Priority Data

Oct. 26, 1967 Japan.............................. 42-68911
Oct. 26, 1967 Japan.............................. 42-68912

[52] U.S. Cl. ................ 23/305; 423/132; 423/489; 423/495; 252/422
[51] Int. Cl.$^2$ ...................... B01D 9/02; C01F 7/50
[58] Field of Search .......... 423/132, 133, 135, 123, 423/489, 495; 23/305, 300, 293 R, 293 A; 252/422; 260/653.4

[56] References Cited
UNITED STATES PATENTS

| | | | |
|---|---|---|---|
| 1,036,453 | 8/1920 | Childs | 423/495 |
| 1,851,475 | 3/1932 | Zimmermann | 423/489 |
| 2,258,412 | 10/1941 | Kahl | 423/489 |
| 2,454,921 | 11/1948 | Heinemann | 423/133 |
| 2,540,493 | 2/1951 | Schnorf et al. | 423/489 |
| 2,681,267 | 6/1954 | Calfee et al. | 423/489 |
| 3,057,681 | 10/1962 | Gernes et al. | 423/489 |
| 3,385,658 | 5/1968 | Broja et al. | 423/495 |
| 3,432,441 | 3/1969 | Gardner | 260/653.4 |
| 3,473,887 | 10/1969 | Chu et al. | 423/495 |
| 3,492,086 | 1/1970 | Bergen et al. | 423/489 |

OTHER PUBLICATIONS

Staritzky et al., Analytical Chemistry, 29, p. 984 (1964).

*Primary Examiner*—Norman Yudkoff
*Assistant Examiner*—S. J. Emery

[57] ABSTRACT

Process for hydrofluorinating acetylene which comprises reacting acetylene with hydrogen fluoride in the vapor phase and in the presence of ϵ-aluminum fluoride at a temperature from about 200° to about 380°C to produce vinyl fluoride and 1,1-difluoroethane, and ϵ-aluminum fluoride being prepared by evaporating an aqueous hydrofluoric acid solution of aluminum fluoride to dryness at a temperature from 30° to 120°C optionally followed by heating the resulting product at a temperature from 120° to 500°C.

7 Claims, No Drawings

ϵ-ALUMINUM FLUORIDE BY EVAPORATING AQUEOUS HF SOLUTION OF ALF₃ UNDER VACUUM TO DRYNESS AND HEATING

This is a continuation of our copending application Ser. No. 156,536, filed June 24, 1971 and now abandoned, which is in turn a continuation of our then copending application Ser. No. 770,337, filed Oct. 24, 1968 and now abandoned.

This invention relates to a novel aluminum fluoride catalyst (i.e., $\epsilon$-aluminum fluoride) and a process for hydrofluorinating acetylene using the same.

The term "$\epsilon$-aluminum fluoride" herein used is intended to mean $\epsilon_1$-aluminum fluoride, $\epsilon_2$-aluminum fluoride and $\epsilon_3$-aluminum fluoride, and their intertransition forms, inclusively.

It is well known that vinyl fluoride, $CH_2=CHF$, and 1,1-difluoroethane, $CH_3CHF_2$, are produced by reacting acetylene with hydrogen fluoride in the vapor phase and in the presence of an aluminum fluoride catalyst. There are several crystalline forms of aluminum fluoride, and some of them are useful as hydrofluorination catalysts. Aluminum fluoride first disclosed in U.S. Pat. No. 2,471,525 was named as $\alpha$-aluminum fluoride in the patents issued thereafter, and $\beta$-aluminum fluoride and $\gamma$-aluminum fluoride were disclosed respectively in U.S. Pat. Nos. 3,178,483 and 3,178,484. $\delta$-Aluminum fluoride was also disclosed in Japanese Pat. Publication No. 2,252/1967 corresponding to U.S. Pat. Nos. 3,178,483 and 3,178,484 and U.S. Pat. applications Ser. Nos. 236,410 and 236,411, both filed on Nov. 8, 1962. These aluminum fluorides are easily characterized by their X-ray diffraction patterns and distinguished one another. They are obtained by dehydrating under selective temperatures $\alpha$-aluminum fluoride trihydrate and $\beta$-aluminum fluoride trihydrate which are prepared by precipitating from an aqueous hydrofluoric acid solution of aluminum or aluminum oxide. They have a high catalytic activity in the reaction of acetylene with hydrogen fluoride, offer a high conversion rate of acetylene and reduce the yields of tars and other by-products. However, in commercial production, their catalyst life is still unsatisfactory.

It has now been found that a crystalline form of the aluminum fluoride obtained by evaporating an aqueous hydrofluoric acid solution of aluminum fluoride at a regulated temperature, optionally followed by heating the product at a selected temperature is distinguished from anyone of known crystalline forms of aluminum fluoride by X-ray diffraction pattern. It has also been found that such aluminum fluoride, named as $\epsilon$-aluminum fluoride, has a longer catalyst life, compared with known aluminum fluorides (i.e., $\alpha$-aluminum fluoride, $\beta$-aluminum fluoride, $\gamma$-aluminum fluoride, $\delta$-aluminum fluoride) used as the catalyst for hydrofluorination of acetylene. The present invention is based on these findings.

Accordingly, a basic object of the present invention is to embody a novel crystalline form of aluminum fluoride useful as a catalyst for hydrofluorination of acetylene. Another object of this invention is to embody an aluminum fluoride catalyst having a long catalyst life in the reaction of acetylene with hydrogen fluoride. A further object of the invention is to embody a process for hydrofluorinating acetylene using $\epsilon$-aluminum fluoride. These and other objects will be apparent to those conversant with the art to which the present invention pertains from the subsequent description.

The $\epsilon$-aluminum fluoride of the present invention is a new crystalline form of aluminum fluoride. It has an excellent catalytic activity, offers a high conversion rate of acetylene and possesses a long catalyst life in the reaction of acetylene with hydrogen fluoride.

The $\epsilon$-aluminum fluoride involves $\epsilon_1$-aluminum fluoride, $\epsilon_2$-aluminum fluoride and $\epsilon_3$-aluminum fluoride, which convert in turn, and intertransition forms of them. Each of $\epsilon_1$-aluminum fluoride, $\epsilon_2$-aluminum fluoride and $\epsilon_3$-aluminum fluoride is stable at a selected temperature range and has a different crystalline structure which is clearly characterized by its X-ray diffraction pattern. The diffraction angles, spacings and intensities of the X-ray diffraction patterns of $\epsilon_1$-aluminum fluoride, $\epsilon_2$-aluminum fluoride and $\epsilon_3$-aluminum fluoride are given in Tables I, II and III, respectively.

Table I. Diffraction angles, spacings and intensities of $\epsilon_1$-aluminum fluoride.

| Diffraction angle 2 θ (degree) | Spacing $\alpha$ (A°) | Intensity |
|---|---|---|
| 8.1 | 10.915 | vst |
| 18.8 | 4.719 | st |
| 24.8 | 3.590 | vst |
| 26.4 | 3.370 | st |
| 28.1 | 3.175 | st |
| 31.2 | 2.866 | vw |
| 33.1 | 2.706 | vw |
| 34.5 | 2.599 | vw |
| 38.3 | 2.350 | vw |
| 45.7 | 1.895 | w |
| 50.8 | 1.797 | st |
| 51.5 | 1.774 | w |
| 54.6 | 1.680 | w |

Note:
st = strong;
w = weak;
v = very.

Table II. Diffraction angles, spacings and intensities of $\epsilon_2$-aluminum fluoride.

| Diffraction angle 2 θ (degree) | Spacing $\alpha$ (A°) | Intensity |
|---|---|---|
| 10.2 | 8.672 | vst |
| 18.8 | 4.719 | st |
| 20.4 | 4.353 | m |
| 23.7 | 3.754 | w |
| 24.9 | 3.561 | vst |
| 28.1 | 3.175 | st |
| 30.7 | 2.912 | vw |
| 47.5 | 1.914 | vw |
| 50.8 | 1.797 | m |

Note:
st = strong;
m = medium;
w = weak;
v = very.

Table III. Diffraction angles, spacings and intensities of $\epsilon_3$-aluminum fluoride.

| Diffraction angle 2 θ (degree) | Spacing (A°) | Intensity |
|---|---|---|
| 11.8 | 7.499 | m |
| 18.8 | 4.719 | m |
| 22.3 | 3.986 | m |
| 25.0 | 3.561 | vst |

| Diffraction angle 2 Θ (degree) | Spacing (A°) | Intensity |
| --- | --- | --- |
| 28.1 | 3.175 | m |
| 51.4 | 1.777 | m |

Note:
st = strong;
m = medium;
v = very.

As shown in Tables I, II and III, $\epsilon_1$-aluminum fluoride has relatively strong X-ray diffraction peaks at angles of diffraction of 2 $\theta$ = 8.1°, 18.8°, 24.8°, 26.4°, 28.1° and 50.8°, $\epsilon_2$-aluminum fluoride has at 2 $\theta$ = 10.2°, 18.8°, 23.7°, 24.9°, 28.1° and 50.8°, and $\epsilon_3$-aluminum fluoride has at 2 $\theta$ = 11.8°, 18.8°, 22.3°, 25.0°, 28.1° and 51.4°.

The $\epsilon$-aluminum fluoride of this invention is obtained by dissolving an aluminum compound, i.e., aluminum fluoride itself or a compound which is reacted with hydrogen fluoride to form aluminum fluoride such as aluminum oxide, aluminum hydroxide or aluminum chloride, in an aqueous solution of hydrogen fluoride and, after removing the precipitate when produced, evaporating the resultant hydrofluoric acid solution of aluminum fluoride to dryness under a temperature of from 30° to 120°C (preferably from 90° to 100°C) to form $\epsilon_1$-aluminum fluoride, optionally followed by heating the $\epsilon_1$-aluminum fluoride at a temperature from 120° to 500°C to give $\epsilon_2$-aluminum fluoride or $\epsilon_3$-aluminum fluoride, or their intertransition form. $\epsilon_1$-Aluminum fluoride gradually changes to $\epsilon_2$-aluminum fluoride when heated above 120°C, and this transition proceeds quite smoothly at a temperature above 140°C. $\epsilon_2$-Aluminum fluoride begins to form $\epsilon_3$-aluminum fluoride at a temperature above 180°C, and $\epsilon_3$-aluminum fluoride is converted to $\alpha$-form when heated above 500°C, the aluminum fluoride in $\alpha$-form being of less catalytic activity. For the preparation of $\epsilon_2$-aluminum fluoride, it is thus preferred to heat $\epsilon_1$-aluminum fluoride at a temperature from 140° to 200°C. For the production of $\epsilon_3$-aluminum fluoride, it is favorable to heat $\epsilon_2$-aluminum fluoride at a temperature from 240° to 400°C.

The transition of $\epsilon$-aluminum fluoride as described above is confirmed from the variation of the peaks of X-ray diffraction between the angles of diffraction of 2 $\theta$ = 8° and of 2 $\theta$ = 12°. $\epsilon_1$-Aluminum fluoride has a strong peak at a diffraction pattern of 2 $\theta$ = 8.0°, which disappears in the X-ray diffraction pattern of $\epsilon_2$-aluminum fluoride. $\epsilon_2$-Aluminum fluoride has a strong peak at 2 $\theta$ = 10.2°. In the intertransition state from $\epsilon_1$-form to $\epsilon_2$-form, medium peaks are observed at both 2 $\theta$ = 8.1° and 10.2°. $\epsilon_3$-Aluminum fluoride has a peak at 2 $\theta$ = 11.8° but loses peaks at 2 $\theta$ = 8.1° and 10.2°. In the intertransition state from $\epsilon_2$-form to $\epsilon_3$-form, it is observed that the peak at 2 $\theta$ = 10.2° moves gradually to 2 $\theta$ = 11.8°, but the peak has broad width and, therefore, the change of the peaks is not clearly acknowledged. Table IV shows the relationship between the heating temperature of $\epsilon_2$-aluminum fluoride and the diffraction angle.

Table IV. Heating temperatures of $\epsilon_2$-aluminum fluoride and diffraction angles.

| Heating temperature (°C) | Diffraction angle at 2 Θ = 10°–12° (degree) |
| --- | --- |
| 200 | 10.2 |
| 220 | 10.4 |
| 250 | 10.6 |
| 270 | 11.0 |
| 300 | 11.8 |
| 400 | 11.8 |

Note:
range of error, ± 10°C.

When $\epsilon_1$-aluminum fluoride is subjected to differential thermal analysis in which 30 milligrams of the specimen is heated at an elevation rate of 10°C per minute, it affords the endothermic change as shown in FIG. 1. The thermogravimetric analysis of $\epsilon_1$-aluminum fluoride is carried out at an elevation rate of 5°C per minute with 100 milligrams of the specimen, and the curve taken from thermobalance is shown in FIG. 2. These thermometric test results are peculiar to $\epsilon$-aluminum fluoride and never observed in known crystalline crystalline forms of aluminum fluoride.

From the above results and by the quantitative analysis of water in $\epsilon$-aluminum fluoride, it is presently concluded that $\epsilon_1$-aluminum fluoride, $\epsilon_2$-aluminum fluoride and $\epsilon_3$-aluminum fluoride correspond to $AlF_3 \cdot 1.5\ H_2O$, $AlF_3 \cdot 0.5\ H_2O$ and $AlF_3$ (anhydrous), respectively.

Still, $\epsilon_1$-aluminum fluoride can be converted to $\epsilon_2$-aluminum fluoride by contacting with a liquid which has a dehydrating effect such as anhydrous methyl alcohol or anhydrous trifluoroacetic acid.

According to the present invention, acetylene is reacted with hydrogen fluoride in the vapor phase and in the presence of $\epsilon$-aluminum fluoride at a temperature from about 200° to about 380°C to produce vinyl fluoride and 1,1-difluoroethane.

In the reaction, any crystalline form of $\epsilon$-aluminum fluoride (i.e., $\epsilon_1$-aluminum fluoride, $\epsilon_2$-aluminum fluoride, $\epsilon_3$-aluminum fluoride, their intertransition form) may be used alone or in mixture as the catalyst. The form of the catalyst may be in a conventional one such as powder, pellets or on a carrier (e.g., activated carbon, alumina).

During the reaction where a temperature from about 200° to about 380°C is applied, $\epsilon_1$-aluminum fluoride is converted to $\epsilon_2$-form, which is further changed partially to $\epsilon_3$-form. Therefore, the catalytically active form of $\epsilon$-aluminum fluoride may be considered as the mixture of $\epsilon_2$-form and $\epsilon_3$-form or the intertransition form from $\epsilon_2$-form to $\epsilon_3$-form.

The $\epsilon$-aluminum fluoride catalyst is placed in a reactor so as to contact the same with a flow of acetylene and hydrogen fluoride.

The reactor may be of horizontal type, vertical type or fluidized-bed type. Any materials which stand hydrogen fluoride at the reaction temperature may be used for the reactor. Examples of such materials are mild steel, stainless steel, nickel, "Monel" and "Inconel". For heating the reactor, any conventional method may be applied.

The reactor and the catalyst are heated to a desired reaction temperature, and a mixture of acetylene and hydrogen fluoride, which may be pre-heated, is fed through the catalyst. The gaseous product from the reactor consisting of vinyl fluoride, 1,1-difluoroethane, unreacted acetylene and hydrogen fluoride, and some of by-products, is first bubbled through water and aqueous alkali and then separated into its constituents by conventional distillation. Acetylene may be alternatively separated by means of solvent extraction or utilizing copper acetylide reaction.

The reaction temperature ranges from about 200° to about 380°C, preferably from about 220° to about 300°C. At temperatures below about 200°C, the conversion rate of acetylene is low, and above about 380°C the formation of by-products increases.

The reaction pressure is not critical, but it is preferred to operate at atmospheric pressure for ease of operation.

For the production of vinyl fluoride, the preferred molar ratio of acetylene to hydrogen fluoride ranges from about 1:1.1 to about 1:1.6, and for 1,1-difluoroethane, from about 1:2.2 to about 1:3.0.

The space velocity of acetylene may be selected appropriately from the range where the high conversion is obtained.

As well known, vinyl fluoride thus obtained is a monomer for producing useful polymers, especially polyvinyl fluoride. 1,1-Difluoroethane is useful as a refrigerant, propellant and as an intermediate for preparing other valuable products such as vinyl fluoride, vinylidene fluoride and chlorodifluoroethane.

Practical and presently preferred embodiments of the present invention are illustratively shown in the following examples.

EXAMPLE 1

In a polyethylene beaker, 500 grams of aluminum hydroxide was added slowly to 1,100 milliliters of 55% hydrofluoric acid with stirring and water-cooling of the acid. After all of the aluminum hydroxide was completely dissolved, the acid solution was evaporated under vacuum at 80°C. The aluminum fluoride thus obtained was identified as $\epsilon_1$-aluminum fluoride by X-ray diffraction.

The $\epsilon_1$-aluminum fluoride was heated in a muffle furnace at 140°C for 2 hours. The X-ray diffraction pattern of the obtained aluminum fluoride showed the mixture of $\epsilon_1$-form and $\epsilon_2$-form, and the substance is assumed to be an intertransition state from $\epsilon_1$-form to $\epsilon_2$-form.

The aluminum fluoride was further heated at 180° to 200°C for 3 hours. The aluminum fluoride thus heat-treated was identified as $\epsilon_2$ aluminum fluoride.

The $\epsilon_2$-aluminum fluoride was heated at 240° to 260°C for 2 hours. The X-ray diffraction angle of the obtained aluminum fluoride was 10.6°. The substance is assumed to be an intertransition state from $\epsilon_2$-form to $\epsilon_3$-form.

The aluminum fluoride was further heated at 300°C for 2 hours. The aluminum fluoride thus obtained was $\epsilon_3$-form. Chemical analysis showed that the molecular formula of $\epsilon_3$-aluminum fluoride was $AlF_3$.

EXAMPLE 2

In a polyethylene beaker, 1,000 grams of powdered anhydrous aluminum chloride was added into 1,500 milliliters of 55% aqueous hydrofluoric acid with stirring and water-cooling. After filtering the precipitate, the acid solution was evaporated to dryness on a water bath. The obtained aluminum fluoride was identified as $\epsilon_1$-aluminum fluoride by X-ray diffraction.

EXAMPLE 3

In a polyethylene beaker, 5 grams of $\epsilon_1$-aluminum fluoride was added into 500 milliliters of anhydrous methyl alcohol. After stirring at room temperature for 50 hours, the methyl alcohol was removed under vacuum. The X-ray diffraction pattern of the obtained aluminum fluoride showed that almost of $\epsilon_1$-aluminum fluoride was converted to $\epsilon_2$-form.

EXAMPLE 4

A tubular stainless steel reactor of 27 millimeters in inner diameter was mounted vertically in an electrically heated molten salt bath, and 60 grams of pelletized $\epsilon_3$-aluminum fluoride obtained in accordance with Example 1 was filled in the reactor. A gaseous mixture of anhydrous hydrogen fluoride and acetylene (molar ratio of $HF/C_2H_2 = 2/1$) was fed into the reactor at a reaction temperature of 260°C and a space velocity of 125 milliliters of acetylene/gram of catalyst/hour (at Standard Temperature and Pressure) from the top of the reactor. The effluent gaseous product from the bottom of the reactor was scrubbed through water and aqueous alkali to remove hydrogen fluoride, dried through calcium chloride and then analyzed by gas chromatography to calculate the conversion rate of acetylene and the yields of the products.

The acetylene used this run was purified by sulfuric acid for removal of acetone.

For comparison, the same procedures were repeated using $\alpha$-aluminum fluoride and $\gamma$-aluminum fluoride.

The results are shown in Table V.

Table V. Comparison of catalyst life of aluminum fluoride.

| Form of AlF$_3$ | Conversion rate of acetylene (%) | | | | |
| --- | --- | --- | --- | --- | --- |
| | 10 hrs. | 50 hrs. | 100 hrs. | 150 hrs. | 200 hrs. |
| $\epsilon_3$ | 99.4 | 99.5 | 99.1 | 98.3 | 98.6 |
| $\gamma$ | 98.7 | 98.4 | 98.1 | 92.2 | 30.9 |
| $\alpha$ | 97.1 | 92.2 | 28.3 | — | — |

In each run, the molar ratio of vinyl fluoride in the product was about 25%, and that of 1,1-difluoroethane was about 75%. When the conversion rate of acetylene was reduced, the formation of vinyl fluoride was increased.

EXAMPLE 5

As in Example 4, the reaction was effected but using $\epsilon_2$-aluminum fluoride obtained in accordance with Example 1 in place of $\epsilon_3$-aluminum fluoride. The conversion rates of acetylene after 10 hours and 200 hours were respectively 99.1% and 98.7%. No practical reduction of the catalytic activity of $\epsilon$-aluminum fluoride was observed.

What is claimed is:

1. A method for preparing ε-aluminum fluoride, characterized by an X-ray diffraction pattern with peaks at angles of diffraction of 8.1° (very strong), 18.8° (strong), 24.8° (very strong), 26.4° (strong), 28.1° (strong) and 50.8° (strong) with spacings in A of 10.915A, 4.719A, 3.590A, 3.370A, 3.175A and 1.797A, respectively, for each angle noted, and having the empirical formula $AlF_3 \cdot 1.5\ H_2O$, which comprises evaporating under vacuum an aqueous hydrofluoric acid solution of aluminum fluoride to dryness at a temperature from 30° to 120°C and heating the resulting product of the evaporation to a temperature of from above 120° to 500°C.

2. A method for preparing ε-aluminum fluoride characterized by an X-ray diffraction pattern with peaks at angles of diffraction at 10.2° (very strong), 18.8° (strong), 23.7° (weak), 24.9° (very strong), 28.1° (strong) and 50.8° (medium) with spacings in A of 8.672A, 4.719A, 3.754A, 3.561A, 3.175A and 1.797A, respectively, for each angle noted, and having the empirical formula $AlF_3 \cdot 0.5\ H_2O$, wherein an aqueous hydrofluoric acid solution of aluminum fluoride is evaporated under vacuum to dryness at a temperature from 30° to 120°C and the resulting product is heated at a temperature from 140° to 200°C.

3. A method for preparing ε-aluminum fluoride, characterized by an X-ray diffraction pattern with peaks at angles of diffraction at 11.8° (medium), 18.8° (medium), 22.3° (medium), 25.0° (very strong), 28.1° (medium) and 51.4° (medium) with spacings in A of 7.499A, 4.719A, 3.986A, 3.561A, 3.175A and 1.777A, respectively, for each angle noted, and having the empirical formula $AlF_3$, which comprises evaporating under vacuum an aqueous hydrofluoric acid solution of aluminum fluoride to dryness at a temperature from 30° to 120°C, and heating the resulting product first at a temperature from 140° to 200°C and then at a temperature from 240° to 400°C.

4. A method for preparing ε-aluminum fluoride according to claim 3, wherein said aqueous hydrofluoric acid solution of aluminum fluoride is evaporated under vacuum to dryness at a temperature from 90° to 100°C.

5. $ε_1$-aluminum fluoride prepared by the process of claim 1.

6. $ε_2$-aluminum fluoride prepared by the process of claim 2.

7. $ε_3$-aluminum fluoride and prepared by the process of claim 3.

* * * * *